United States Patent
Ferrara

(10) Patent No.: US 9,707,713 B2
(45) Date of Patent: Jul. 18, 2017

(54) DYE SUBLIMATION PRINTING ON POLYMER FILM FOR MOLDED PACKAGE PRINTING

(71) Applicant: XEROX CORPORATION, Norwalk, CT (US)

(72) Inventor: Joseph M. Ferrara, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 456 days.

(21) Appl. No.: 14/507,496

(22) Filed: Oct. 6, 2014

(65) Prior Publication Data

US 2016/0096310 A1 Apr. 7, 2016

(51) Int. Cl.
*B29C 51/16* (2006.01)
*B29K 67/00* (2006.01)
*B29L 31/00* (2006.01)

(52) U.S. Cl.
CPC ...... *B29C 51/165* (2013.01); *B29K 2067/003* (2013.01); *B29L 2031/712* (2013.01)

(58) Field of Classification Search
CPC .............................. B29C 51/165; B29C 51/16
See application file for complete search history.

(56) References Cited

U.S. PATENT DOCUMENTS

| 4,059,471 A * | 11/1977 | Haigh ............... B29C 49/52 |
|---|---|---|
| | | 101/34 |
| 4,596,190 A * | 6/1986 | Hanstein ............ B29C 51/00 |
| | | 101/32 |
| 8,475,905 B2 | 7/2013 | Abrams |
| 2013/0292287 A1 | 11/2013 | Stanley et al. |
| 2014/0033655 A1 | 2/2014 | Stanley et al. |

OTHER PUBLICATIONS

Peter Swain, "Sublimation 101: The Complete Guide to Successful Dye Sublimation Printing", Sawgrass Technologies Inc., 2011, pp. 1-62.

* cited by examiner

*Primary Examiner* — Stella Yi
(74) *Attorney, Agent, or Firm* — MH2 Technology Law Group LLP

(57) ABSTRACT

A method for printing a package substrate prior to molding the package substrate into a desired shape. The present teachings include printing an aqueous ink onto a sacrificial carrier to form an ink pattern, and then drying the ink pattern on the carrier. The carrier and ink pattern are aligned with a package substrate and placed into a mold fixture. The ink pattern is transferred to the package substrate within the mold fixture during the molding of the package substrate into the desired shape. The ink pattern may be transferred from the sacrificial carrier to the package substrate using, for example, a dye sublimation (dye diffusion) process.

18 Claims, 3 Drawing Sheets

DYE SUBLIMATION PRINTING ON POLYMER FILM FOR MOLDED PACKAGE PRINTING

TECHNICAL FIELD

The present teachings relate to the field of molded packaging such as clamshell packaging and, more particularly, to a method for printing a polymer molded package.

BACKGROUND

Packaging for retail items and other products is designed in an attempt to fulfill various objectives depending on the customer. For example, the packaging should securely encase and protect the item from damage during shipping and while displayed to potential consumers. The packaging should discourage removal from the product from the container by potential customers. Additionally, retail packaging should be visually appealing to a potential customer. Further, for both retail and non-retail products, the packaging should identify the product by number for inventory control and/or by name to assist a customer in brand and product identification.

Clamshell packaging and other molded packaging is commonly used for its ability to fulfill the above-stated objectives. Clamshell packaging may include a hinged body molded from a single piece of polymer, where the body includes a front side and a back side. The product may be placed onto one side of the body, then the opposite side is folded along the hinge to mate with the other side. The two sides may be connected together using a friction attachment formed from ridges or bumps on each side. In an alternative, the two sides may be connected together by clamping, heating, and melting the two sides together to provide a more protective encasement of the product.

Before the two sides are connected together, a printed cardboard or plastic insert may be placed within the packaging to identify the product, to provide other product or manufacturer information, or to display attractive graphics to a potential customer in an attempt to increase sales. In another packaging technique, the product or manufacturer information may be printed onto the outside or inside surface of the packaging after molding of the clamshell using a solid ink. In yet another packaging process, a decal including product or manufacturer information may be adhered to the inside or outside of the packaging after molding.

Including a printed cardboard or plastic insert requires additional packaging inventory, added storage space, and additional handling during product packaging, as does the use of a decal. Printing ink onto the product after molding can be challenging as product packaging typically includes contours that are difficult and costly for a manufacturer to print on. Further, decals and printed inks are merely deposited on the surface of the packaging and may therefore flake off or be worn away, scratched, or otherwise damaged by a shifting product inside of the package or through physical contact with boxes or other structures external to the package during product transport and display. Additionally, inserts are often discarded soon after the package is opened and offer no real value to the consumer.

Dye sublimation printing has been used to print on flat items such as identification cards and pre-formed contoured items using a specialty ink. However, these inks are prone to cracking, scratching, and flaking after printing. Forming a print on a contoured surface of a package may be performed by printing onto a label using flexography or offset printing, then adhering the label to the contoured surface of the package. However, because the print is exposed, the label may be damaged from contact with other surfaces during shipping or retail display. Further, these labels are costly to print, handle, and store until use.

A molded packaging product and method that avoids some or all of the deficiencies of prior packaging would be desirable.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

The present teachings include a method for forming a printed molded package container, including printing an ink pattern onto a sacrificial carrier to form a printed sacrificial carrier, aligning the printed sacrificial carrier with a package substrate, heating the printed sacrificial carrier while heating the package substrate to transfer the ink pattern from the printed sacrificial carrier to the package substrate to form a printed package substrate, and molding the package substrate during the heating of the package substrate.

The present teachings further include a method for forming a printed molded package container, including printing an ink onto a synthetic composite transfer paper to form a printed sacrificial carrier, wherein ink is an aqueous dye sublimation ink, aligning the printed sacrificial carrier with a package substrate, wherein the package substrate comprises polyester, and heating the ink on the printed sacrificial carrier and the package substrate while physically contacting the ink on the printed sacrificial carrier with the package substrate. The method further includes, during the heating of the ink on the printed sacrificial carrier and the package substrate, molding the package substrate, and separating the synthetic composite transfer paper from the package substrate.

BRIEF DESCRIPTION OF THE DRAWINGS

The accompanying drawings, which are incorporated in and constitute a part of this specification, illustrate embodiments of the present teachings and, together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified, the word "printer" encompasses any apparatus that performs a print outputting function for any purpose, such as a digital copier, bookmaking machine, facsimile machine, a multi-function machine, electrostatographic device, etc. Unless otherwise specified, the word "polymer" encompasses any one of a broad range of carbon-based compounds formed from long-chain molecules including thermoset polyimides, thermoplastics, resins, polycarbonates, epoxies, and related compounds known to the art.

An embodiment of the present teachings can result in a printed polymer substrate, such as a printed molded polymer substrate, that may be used for product packaging or other uses. Contrary to other printed molded package substrates or other substrates having a contour that are printed after a package molding or substrate forming process, a package substrate in accordance with the present teachings may be printed prior to molding or contouring the package substrate. Further, contrary to other printed molded package substrates or other substrates having an ink layer that lies on the surface of the substrate, a substrate in accordance with the present teachings includes a sublimated ink (e.g., a sublimated dye) that chemically bonds with the substrate so that ink flaking, wearing, or scratching is reduced or eliminated.

A process for forming a printed molded substrate such as a packing substrate is described in detail below with reference to FIGS. 1 and 2. It will be appreciated that a process in accordance with the present teachings may include other processing steps or substructures that are not depicted for simplicity, and that depicted processes or substructures may be removed or modified.

Figure 1:
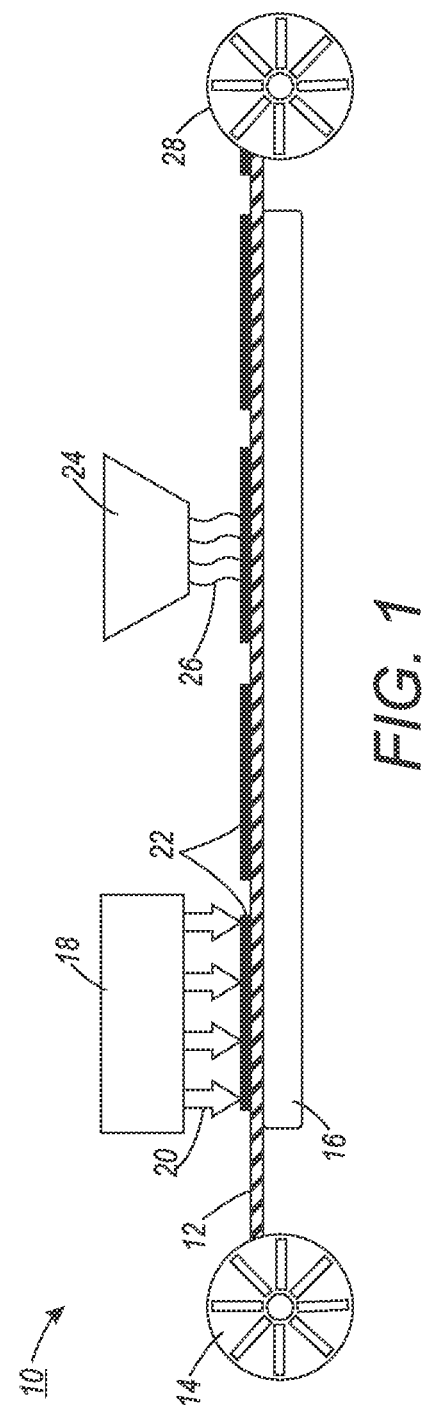
FIG. 1 is a schematic depiction of a process for printing an ink pattern onto a sacrificial carrier according to an embodiment of the present teachings.

FIG. 1 illustrates a printing process 10 for printing an ink pattern onto a flat section of a sacrificial web or carrier. In the FIG. 1 printing process 10, the sacrificial web or carrier 12 may be supplied from a supply reel 14 or by another supply source, and onto a workstation 16 such as a printing station, table, conveyor, etc. The sacrificial carrier 12 may be a synthetic composite transfer paper such as a heat-resistant absorbent paper having a melting or combustion temperature of about 350° C. or greater, or about 395° C. or greater, or about 425° C. or greater.

A printer 18 then dispenses one or more colors of ink 20 onto the sacrificial carrier 12 to form an ink pattern 22. In an embodiment, the printer 18 may be an aqueous inkjet printer that jets a liquid aqueous ink from a plurality of nozzles in one or more printheads (not individually depicted for simplicity). The aqueous ink 20 may include a solution of a dye solute (i.e., pigment) in a water solvent. The aqueous ink 20 can be a dye sublimation ink available from, for example, Sawgrass™ Technologies (Johnson Plastics) of Minneapolis, Minn.

In another embodiment, an aqueous ink may be printed onto the sacrificial carrier 12 using another ink dispensing process, in which printer 18 represents a contact printer that forms ink pattern 22 by contact printing or microcontact printing, a screen printer that forms ink pattern 22 using screen printing, etc. Each section of ink pattern 22 illustrated in FIG. 1 may represent an individual pattern, each of which will be printed on a different product package. In another embodiment, the ink pattern 22 printed on the sacrificial carrier 12 may be continuous.

After printing the ink pattern 22, the printed sacrificial carrier 12 printed with the ink pattern 22 is transferred to a dryer 24 outputting a heat source 26 to evaporate or otherwise remove the water solvent and dry the ink, but without sublimating the ink. The dryer 24 may output an infrared heat source, a radiant heat source, a convective heat source, etc. In an embodiment, the ink pattern 22 can be heated to a temperature of below the sublimation temperature (e.g., below the sublimation point) of the ink, for example, below about 190° C. or less depending on the ink formulation. After evaporating the water solvent to form a dried ink pattern 22, the ink pattern 22 may be cooled, for example, to below about 27° C., or to an ambient temperature of about 22° C.

Figure 2:
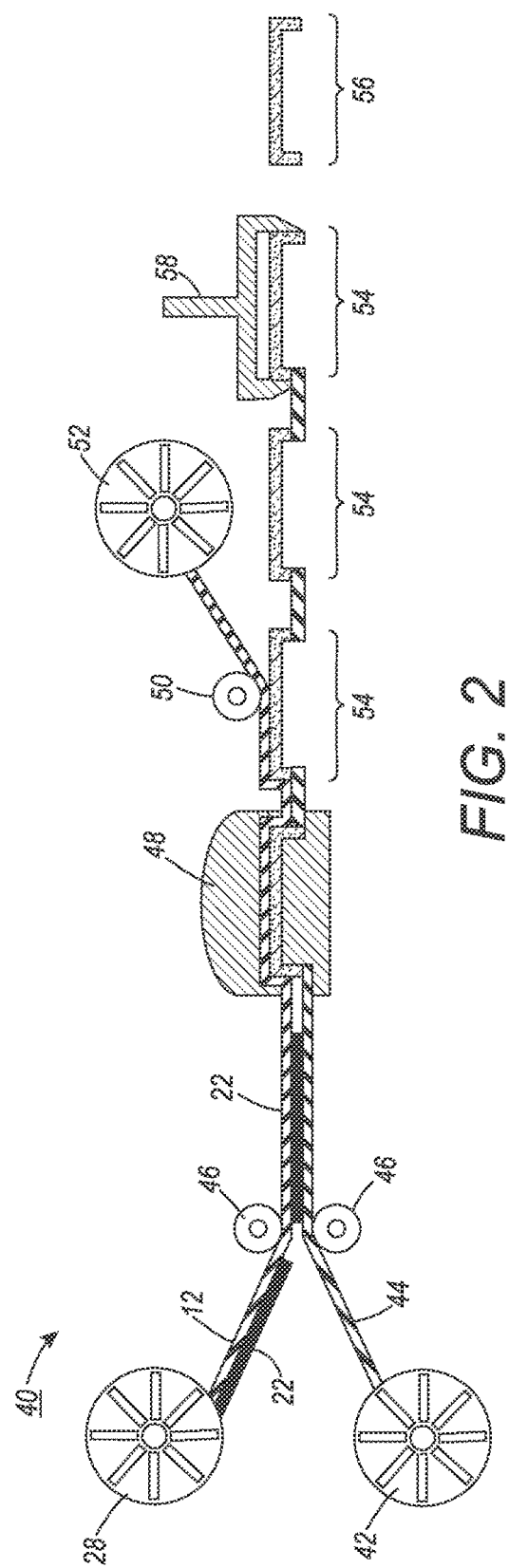
FIG. 2 is a schematic depiction of a process for transferring a printed ink pattern from a sacrificial carrier to a package substrate according to an embodiment of the present teachings.

In an embodiment, after the ink pattern 22 is exposed to the heat source 26 from the dryer 24, the sacrificial carrier 12 and dried ink pattern 22 thereon can be prepared for transport to the molding process 40 of FIG. 2. The preparation can include winding the sacrificial carrier 12 and dried ink pattern 22 onto a take-up reel 26 as depicted. In another embodiment, the preparation can include directly transporting the sacrificial carrier 12 and dried ink patter 22 to the mold depicted in FIG. 2.

Subsequently, the molding and trimming process 40 as depicted in FIG. 2 can be initiated. In an embodiment, the take-up reel 28 becomes the supply reel 28 for the FIG. 2 process 40. Additionally, a polymer supply reel 42, or another supply source, is used as a source for a flat package substrate 44. In an embodiment, the package substrate 44 must be a polyester such as polyethylene terephthalate (PET) or another suitable material. The package substrate 44 may have a melting point of from about 240° C. to about 270° C., or about 250° C.

Next, the sacrificial carrier 12 and the package substrate 44 are aligned in the X- and Y-directions and placed in proximity to each other as depicted in FIG. 2, wherein the dried ink pattern 22 is interposed between the package substrate 44 and the sacrificial carrier 12. The package substrate 44 and the sacrificial carrier 12 may be brought together using, for example, a pair of rollers 46 as depicted. Subsequently, the sacrificial carrier 12, the ink pattern 22 and the package substrate 44 are transported to, and placed within, a mold fixture 48. FIG. 2 depicts a mold press as a mold fixture 48, but it will be appreciate that other mold fixtures such as a vacuum mold may also be suitable. The mold fixture heats the package substrate 44 to a temperature that is sufficient to melt the package substrate 44, and molds the package substrate 44 into a desired shape defined by the mold fixture 46. Without being bound by theory, during the molding of the package substrate 44, pores within the PET expand and open to a size larger than a size of the ink molecules. The dye sublimation ink that forms the ink pattern 22 vaporizes or gasifies into a gas and fills the open pores within the PET. Upon cooling of the PET, the ink becomes solid and the pores close, thereby trapping the dye sublimation ink that forms the ink pattern 22 within the closed pores and below the surface of the PET. This physical bonding of the package substrate 44 with the ink pattern 22 may be referred to as a dye sublimation printing process or a dye diffusion printing process. In other words, during the molding process, the aqueous ink that forms the ink pattern 22 physically contacts the package substrate 44, gasifies (e.g., vaporizes), and diffuses below the surface and into the interior of the package substrate 44. Additionally, because the aqueous ink that forms the ink pattern 22 gasifies during the molding process, it can be molded along with the package substrate 44 without cracking. Further, because it is formed below the surface and into the interior of the package substrate 44, the ink pattern 22 is durable and resists wear or scratching, even though the surface of the package substrate 44 may be worn or scratched.

The molding process at the molding fixture 48 may be performed at a temperature that is sufficient to both melt the package substrate 44 and gasify the ink pattern 22, but at a sufficiently low temperature that the sacrificial carrier 12 is not melted or combusted. In an embodiment, the molding of the package substrate 44 and gasification of the ink pattern 22 may be performed at a temperature of from about 375° C. to about 400° C., for example about 390° C. The molding process can be performed for a duration dependent on the material formulation and material thickness used in the particular application.

Subsequently, the printed package substrate 44, which has been printed using the dye diffusion process described above to include the ink pattern 22 diffused therein, is sufficiently cooled such that it may be removed from the mold fixture 48. The sacrificial carrier 12 separated (i.e., removed) from the surface of the package substrate 44, for example, using a peeling process as depicted, or another removal process such as a stripping process, a washing process, a blasting process, for example using a water jet, or another sacrificial carrier 12 removal process. In the peeling process depicted, the sacrificial carrier 12 is removed using a roller 50 and wound on a take-up reel 52. The sacrificial carrier 12 may be reused, recycled, or discarded.

As depicted in FIG. 2, a plurality of continuous (i.e., interconnected) package containers 54 may be formed from the package substrate 44 at the mold fixture 48. After molding each package container 54, the plurality of package containers 54 can be segmented into individual package containers 56 at a trimmer 58 such as a punch trimmer or another sufficient trimmer. In another embodiment, the mold fixture 48 may be designed to segment the package substrate 44 into individual containers 56 during the mold process. The mold fixture 48 may further be designed to cut the sacrificial carrier 12 such that it can be subsequently removed from the container 56.

It will be appreciated that the molded container 56 may have any desired shape. The container 56 may have an integrated hinge (not depicted for simplicity) that is formed during molding of the package substrate 44 at the molding fixture 48, such that the package container 56 includes a clamshell design. In lieu of a hinge, the package container 56 may be, for example, a first half of a container formed with friction bubble mounts (not individually depicted for simplicity) that mates with a second container half (not individually depicted for simplicity) that is separately formed. The second container half may also include friction bubble mounts that fit within the friction bubble mounts of the first half of the container, wherein the friction bubble mounts connect and secure the two halves together.

Figure 3:
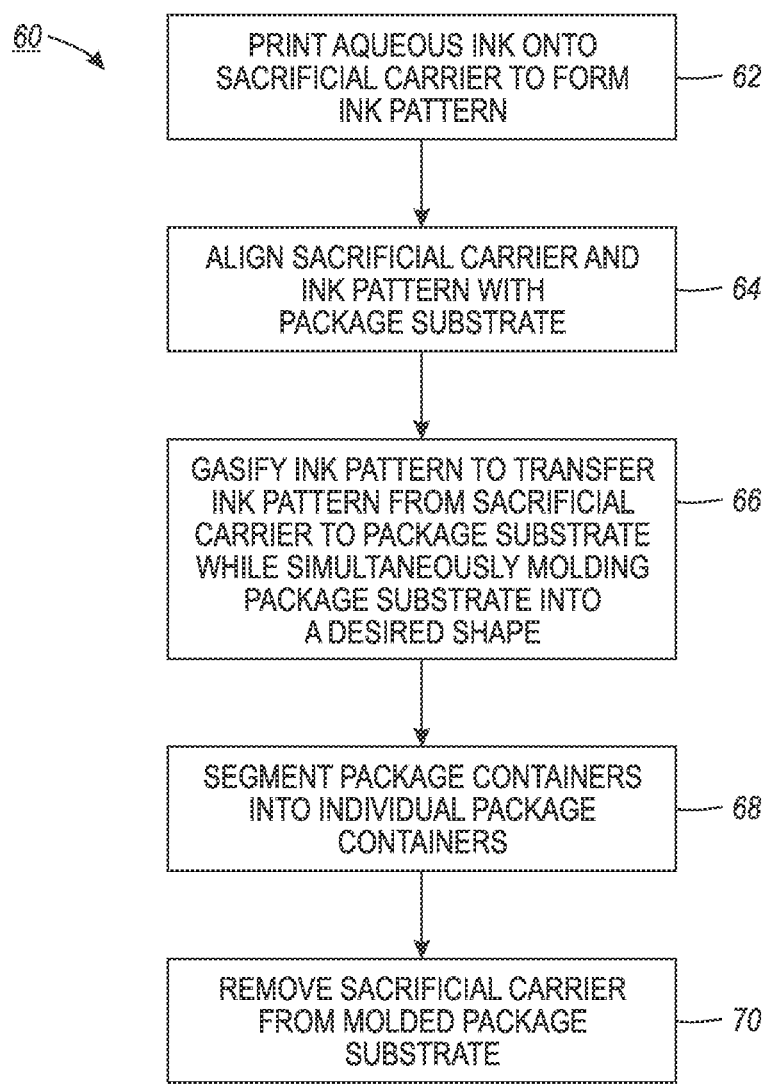
FIG. 3 is a flow diagram depicting a process for printing an ink pattern onto a sacrificial carrier and transferring the printed ink pattern from the sacrificial carrier to a package substrate according to an embodiment of the present teachings.

FIG. 3 is a flow diagram depicting an embodiment of the present teachings for forming a printed molded package container. At 62, an aqueous ink may be printed onto a sacrificial carrier to form an ink pattern on the sacrificial carrier. Subsequently, the sacrificial carrier and the ink pattern are aligned with a package substrate at 64. At 66, the ink pattern is gasified to transfer the ink pattern from the sacrificial carrier to the package substrate. Simultaneously, the package substrate is molded into a desired shape to form one or more package containers. The ink pattern may be gasified using heat from a mold fixture that is also used to heat and mold the package substrate into the desired shape. The package containers are segmented into individual package containers 68, at the mold fixture, subsequently at a trimming fixture, or using another process. Next, the sacrificial carrier is removed from the molded package substrate 70.

It will be realized that the ordering of the process steps described herein and in FIG. 3 may be altered or removed, or other process steps may be added. For example, the sacrificial carrier may be removed from the molded package before the continuous package containers are segmented into individual containers.

Thus in the process described above, the ink pattern is printed before the molding of the package substrate. Further, the dye diffusion process that chemically combines the ink pattern with the package substrate occurs simultaneously with the molding of the flat package substrate into a contoured package substrate. Additionally, the ink pattern is integrated into, and below, the surface of the package substrate and into the interior of the package substrate (i.e., between a front surface and a back surface of the package substrate). This is in contrast to other contoured package substrate printing processes that are printed with an ink pattern after formation of a contoured package, print processes that form a printed pattern only on the surface of the package substrate, processes that form a decal that is attached to the package substrate, and processes that mold the package substrate at a different time than the ink pattern is printed on, or applied to, the package substrate.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for forming a printed molded package container, comprising:
    printing an ink pattern onto a sacrificial carrier to form a printed sacrificial carrier;
    aligning the printed sacrificial carrier with a package substrate;
    heating the printed sacrificial carrier and the package substrate to a temperature of from 375° C. to 400° C. to transfer the ink pattern from the printed sacrificial carrier to the package substrate to form a printed package substrate; and
    molding the package substrate during the heating of the package substrate.

2. The method of claim 1, further comprising aligning the printed sacrificial carrier with a polyester package substrate during the alignment of the printed sacrificial carrier with the package substrate.

3. The method of claim 1, further comprising printing an aqueous ink onto the sacrificial carrier during the printing of the ink pattern, wherein the aqueous ink comprises a dye solute and a water solvent.

4. The method of claim 3, wherein the printing of the aqueous ink further comprises printing a dye sublimation ink.

5. The method of claim 4, further comprising evaporating an amount of the water solvent from the dye sublimation ink prior to the transfer of the ink pattern from the printed sacrificial carrier to the package substrate.

6. The method of claim 5, further comprising heating the dye sublimation ink to a temperature of 190° C. or less during the evaporating of the amount of the water solvent.

7. The method of claim 5, further comprising winding the sacrificial carrier and the ink pattern onto a take-up reel prior to the transfer of the ink pattern from the printed sacrificial carrier to the package substrate.

8. The method of claim 1, further comprising:
    placing the printed sacrificial carrier and the package substrate into a mold fixture; and
    simultaneously heating the printed sacrificial carrier and the package substrate within the mold fixture to transfer the ink pattern from the printed sacrificial carrier to the package substrate.

9. The method of claim 8, wherein the molding of the package substrate is performed simultaneously during the transfer of the ink pattern from the printed sacrificial carrier to the package substrate.

10. The method of claim 1, further comprising:
    physically contacting the ink pattern on the printed sacrificial carrier with the package substrate; and
    performing the heating of the printed sacrificial carrier while physically contacting the ink pattern with the package substrate.

11. A method for forming a printed molded package container, comprising:
    printing an ink onto a synthetic composite transfer paper to form a printed sacrificial carrier, wherein ink is an aqueous dye sublimation ink;
    aligning the printed sacrificial carrier with a package substrate, wherein the package substrate comprises polyester;
    heating the ink on the printed sacrificial carrier and the package substrate while physically contacting the ink on the printed sacrificial carrier with the package substrate;
    heating the printed sacrificial carrier and the package substrate to a temperature of from 375° C. to 400° C. during the heating of the ink on the printed sacrificial carrier and the package substrate while physically contacting the ink on the printed sacrificial carrier with the package substrate;
    during the heating of the ink on the printed sacrificial carrier and the package substrate, molding the package substrate; and
    separating the synthetic composite transfer paper from the package substrate.

12. The method of claim 11, further comprising aligning the printed sacrificial carrier with a polyethylene terephthalate package substrate during the alignment of the printed sacrificial carrier with the package substrate.

13. The method of claim 11, wherein the dye sublimation ink comprises a water solvent and a dye solute and the method further comprises evaporating the water solvent from the dye solute by heating the dye sublimation ink to a temperature that is below a sublimation point of the dye sublimation ink to form a dried ink pattern.

14. The method of claim 11, wherein the dye sublimation ink comprises a water solvent and a dye solute and the method further comprises evaporating the water solvent from the dye solute by heating the dye sublimation ink to a temperature of 190° C. or less to form a dried ink pattern.

15. The method of claim 14, further comprising cooling the dried ink pattern to a temperature of about 27° C. or less prior to the heating of the ink on the printed sacrificial carrier and the package substrate while physically contacting the ink on the printed sacrificial carrier with the package substrate.

16. The method of claim 14, further comprising cooling the dried ink pattern to a temperature of about 27° C. or less.

17. A method for forming a printed molded package container, comprising:
   printing an ink onto a synthetic composite transfer paper to form a printed sacrificial carrier, wherein ink is an aqueous dye sublimation ink comprising a water solvent and a dye solute;
   aligning the printed sacrificial carrier with a package substrate, wherein the package substrate comprises polyester;
   heating the ink on the printed sacrificial carrier and the package substrate while physically contacting the ink on the printed sacrificial carrier with the package substrate;
   during the heating of the ink on the printed sacrificial carrier and the package substrate, molding the package substrate;
   evaporating the water solvent from the dye solute by heating the dye sublimation ink to a temperature of 190° C. or less to form a dried ink pattern;
   cooling the dried ink pattern to a temperature of about 27° C.; and
   separating the synthetic composite transfer paper from the package substrate.

18. The method of claim 17, further comprising aligning the printed sacrificial carrier with a polyethylene terephthalate package substrate during the alignment of the printed sacrificial carrier with the package substrate.

* * * * *